(12) United States Patent
Robison et al.

(10) Patent No.: US 10,019,577 B2
(45) Date of Patent: Jul. 10, 2018

(54) HARDWARE HARDENED ADVANCED THREAT PROTECTION

(71) Applicant: Dell Products, L.P., Round Rock, TX (US)

(72) Inventors: Charles D. Robison, Buford, GA (US); Chad R. Skipper, Granger, TX (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 114 days.

(21) Appl. No.: 15/098,930

(22) Filed: Apr. 14, 2016

(65) Prior Publication Data

US 2017/0300692 A1 Oct. 19, 2017

(51) Int. Cl.
*G06F 21/56* (2013.01)
*G06F 21/57* (2013.01)

(52) U.S. Cl.
CPC .......... *G06F 21/566* (2013.01); *G06F 21/575* (2013.01); *G06F 2221/033* (2013.01)

(58) Field of Classification Search
CPC . G06F 21/566; G06F 21/575; G06F 2221/033
See application file for complete search history.

(56) References Cited

U.S. PATENT DOCUMENTS

| 8,365,297 | B1 * | 1/2013 | Parshin | G06F 21/53 |
| | | | | 713/2 |
| 8,572,742 | B1 * | 10/2013 | Linhardt | G06F 9/4401 |
| | | | | 713/2 |
| 2015/0319171 | A1 | 11/2015 | Robison et al. | |
| 2016/0055113 | A1 * | 2/2016 | Hodge | G06F 21/575 |
| | | | | 710/308 |
| 2016/0087795 | A1 * | 3/2016 | Ma | G11C 7/24 |
| | | | | 380/44 |

OTHER PUBLICATIONS

Wilkins et al., UEFI Secure Boot in Modern Computer Security Solutions, published by UEFI, Sep. 2013, pp. 1-10.*
Broadcom Corporation, "BCM5880 Cryptographic Module Security Policy, Document Version 1.1", Revision Date: Feb. 2, 2010, 28 Pages.

* cited by examiner

*Primary Examiner* — Ellen Tran
(74) *Attorney, Agent, or Firm* — Fogarty LLP

(57) ABSTRACT

Systems and methods for hardware hardened advanced threat protection are described. In some embodiments, an Information Handling System (IHS) may include a processor; and a Basic Input/Output System (BIOS) coupled to the processor, the BIOS having BIOS instructions stored thereon that, upon execution, cause the IHS to: launch an Extensible Firmware Interface (EFI) gateway module; and determine, using the EFI gateway module, whether the BIOS instructions include malware.

20 Claims, 3 Drawing Sheets

HARDWARE HARDENED ADVANCED THREAT PROTECTION

FIELD

This disclosure relates generally to Information Handling Systems (IHSs), and more specifically, to systems and methods for hardware hardened advanced threat protection.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the Operating System (OS), as well as other high-level software. In some IHSs, this low-level code is known as the Basic Input/Output System ("BIOS"). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface ("EFI") Specification, and which has been extended by the Unified Extensible Firmware Interface Forum ("UEFI").

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, etc.

As the inventors hereof have recognized, there has recently been an increased threat of malware infiltration with respect to the BIOS. To attempt to identify such malware, conventional IHSs may implement a "safe boot" process whereby the IHS examines the BIOS during boot and compares its present state with known good code used in a prior successful boot. If any changes have been made to the code, the user may be alerted and/or the process may be halted. As the inventors hereof have also determined, however, not all changes to the boot code are malicious. Moreover, conventional safe boot processes may still fail to identify certain types of malware.

SUMMARY

Embodiments of systems and methods for hardware hardened advanced threat protection are described herein. In an illustrative, non-limiting embodiment, an Information Handling System (IHS) may include a processor; and a Basic Input/Output System (BIOS) coupled to the processor, the BIOS having BIOS instructions stored thereon that, upon execution, cause the IHS to: launch an Extensible Firmware Interface (EFI) gateway module; and determine, using the EFI gateway module, whether the BIOS instructions include malware.

In some cases, the launch of the EFI gateway module occurs immediately after a Power-On Self-Test (POST). The determination may be performed in response to another determination that a change has taken place in the BIOS instructions since a last boot. Moreover, to determine whether the BIOS instructions include malware, the EFI gateway module may be configured to apply a behavior-based threat model to a behavior of the IHS during a booting of the IHS.

The IHS may also include an embedded controller coupled to the processor and an off-host authentication processing system coupled to the embedded controller, wherein the off-host authentication processing system provides a hardware environment segregated from the processor, wherein the off-host authentication processing system has an off-host processor and an off-host memory coupled to the off-host processor, and wherein the behavior-based threat model is stored in the off-host memory.

The behavior-based threat model may be retrieved by the EFI gateway module through the embedded controller upon presentation of a key by the embedded controller to the off-host processor. For example, the key may be derived by the embedded controller upon request by the EFI gateway module. In some cases, the key may be derived based upon a voltage within the processor, a temperature of the processor, and/or a serial number of the processor.

In some implementations, the determination may be performed by the processor. Alternatively, the determination may be performed by the embedded controller. Alternatively, the determination may be performed by the off-host processor.

In another illustrative, non-limiting embodiment, a BIOS may have program instructions stored thereon that, upon execution by a processor of an IHS, cause the IHS to: launch an EFI gateway module and determine, using the EFI gateway module, whether the instructions include malware. In yet another illustrative, non-limiting embodiment, a method in an IHS may include launching, by a processor of the IHS, an EFI gateway module as part of a set of BIOS instructions immediately after POST; and determining, using the EFI gateway module, whether the BIOS instructions include malware.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods described herein may provide hardware hardened advanced threat protection. First, data models may be created for known good and/or known malicious code that is encountered during the boot process. An EFI gateway module may be created to handle messaging and boot interrupt, and placed in the boot order. The resulting threat model is stored in hardware and is known as the reference template.

A device then performs a measured boot where processes and their features are captured and a representation of this measure is compressed into a candidate template and stored in protected device memory. A pointer is sent from the environment (pre-boot, in this case) to hardware where the candidate template is stored in protected memory. If the match indicates a compromise, the EFI gateway module may alert a user and/or provide mediation.

In some cases, a hash of the boot model shall be created and used for matching. Only if the hash does not match (meaning something changed in the boot processes), should a full boot model match take place.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
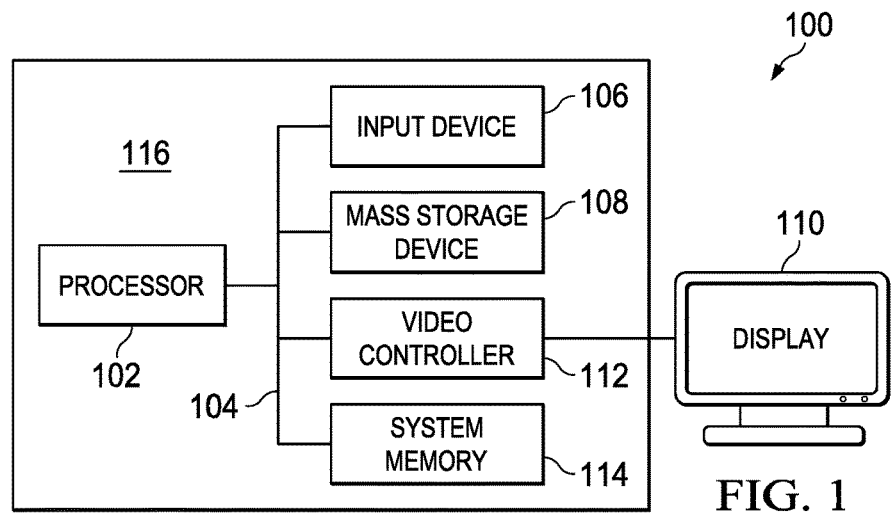
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other input devices. Programs and data are stored on mass storage device 108, which is coupled to processor 102. Examples of mass storage devices may include hard discs, optical disks, magneto-optical discs, solid-state storage devices, and/or a variety other mass storage devices.

IHS 100 further includes display 110, which is coupled to processor 102 by video controller 112. System memory 114 is coupled to processor 102 to provide processor 102 with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices. In an embodiment, chassis 116 houses some or all of the components of IHS 100. It should be understood that other buses and intermediate circuits may be deployed between the components described above and processor 102 to facilitate interconnection between those components and processor 102.

Figure 2:
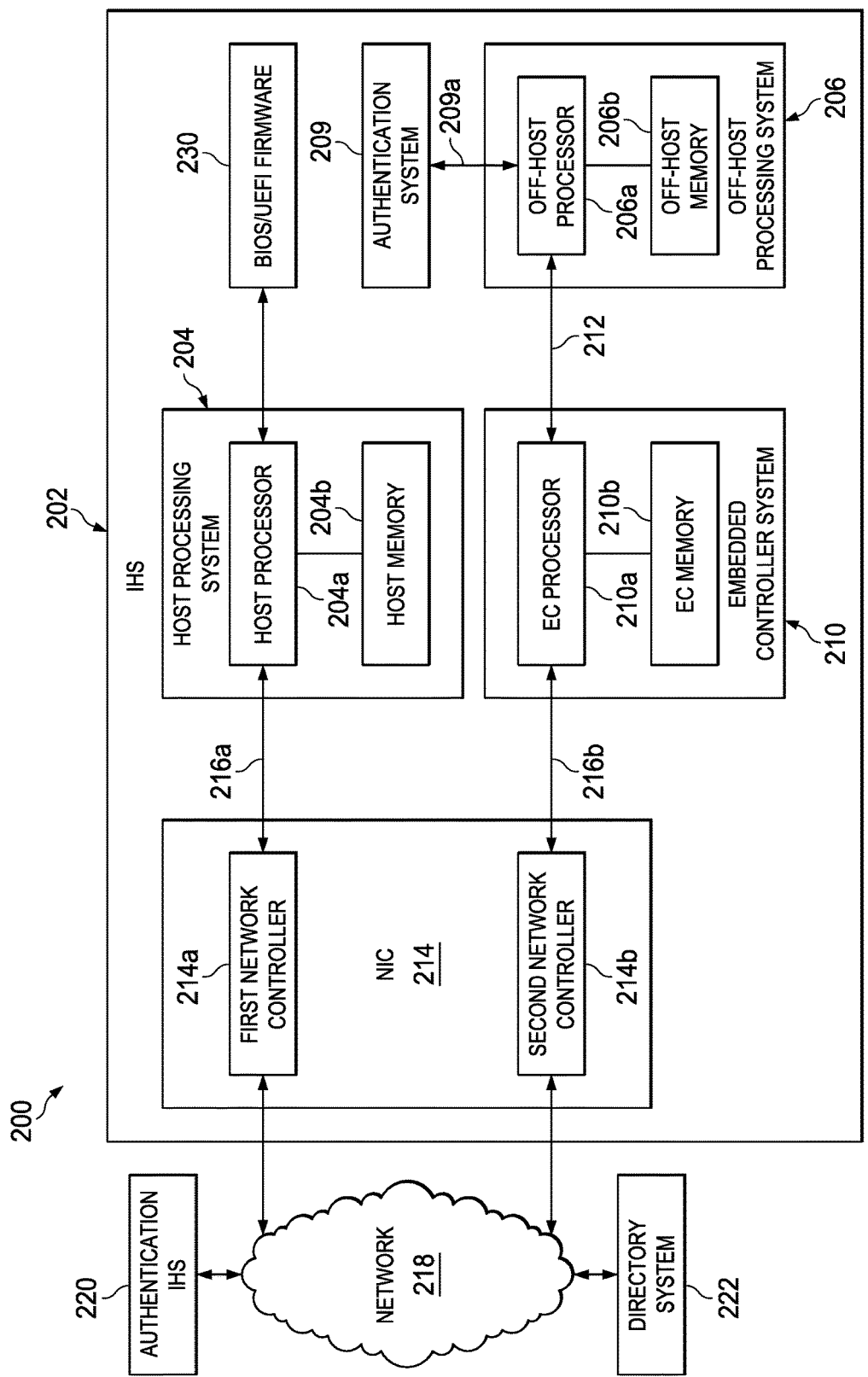
FIG. 2 is a schematic view illustrating an example of an environment where an off-host authentication processing system may be used according to some embodiments.

Referring now to FIG. 2, an embodiment of environment 200 where off-host authentication processing system 206 may be used is illustrated. Environment 200 includes IHS 202, which may be IHS 100 and/or may include some or all of the components of IHS 100. For example, IHS 100 may be a server IHS, a desktop IHS, a laptop/notebook IHS, a tablet IHS, a mobile phone IHS, and/or a variety of other IHSs. IHS 202 comprises host processing system 204, which in turn comprises host processor 204a, host memory 204b, and/or other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 includes BIOS/UEFI ("BIOS") firmware 230 discussed in more detail with respect to FIGS. 3 and 4 below. Generally speaking, BIOS 230 includes BIOS instructions, some of which may be loaded by host processor 204a into host memory 204b during the booting of IHS 202 to facilitate initialization of IHS 202. In various embodiments, the boot up process typically involves performing a power-on self-test (POST), locating and initializing peripheral devices and their drivers, and then finding, loading and starting an OS.

IHS 202 also comprises embedded controller system 210 that includes embedded controller processor 210a, embedded controller memory 210b, and/or other embedded controller components. For example, embedded controller processor 210a in embedded controller system 210 may include a processor, and embedded controller memory 210b in embedded controller system 210 may include a memory device that includes instructions that, when executed by embedded controller processor 210a, cause embedded controller processor 210a to perform operations discussed further below.

In the illustrated embodiment, embedded controller processor 210a is coupled to off-host processor 206a via bus 212 such as, for example, a Low-Pin Count (LPC) connection. However, bus 212 may be any variety of physical/logical bus connections that support encrypted communications, including but not limited to, an LPC connection, a USB, a Thunderbolt interface, an $I^2C$, an SPI, a PCI, and/or other bus connections.

IHS 202 also includes network interface controller 214 that provides first network controller 214a, second network controller 214b, and/or other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214*b* by assigning to the first network controller 214*a* a first Media Access Control (MAC) address that is different from a second MAC address that is assigned to the second network controller 214*b*. In another embodiment, first network controller 214*a* and second network controller 214*b* may be segregated from each other in another manner such as, for example, by providing first network controller 214*a* on a different network interface controller than second network controller 214*b*.

Host processor 204*a* of host processing system 204 is coupled to first network controller 214*a* in network interface controller 214 via bus 216*a*, and embedded controller processor 210*a* in embedded controller system 210 is coupled to second network controller 214*b* in network interface controller 214 via bus 216*b*. In some embodiments, buses 216*a* and 216*b* may be part of the same bus such as, for example, an I$^2$C connection that couples host processing system 204 and embedded controller system 210 to network interface controller 214. However, bus 214 may be any variety of physical/logical bus connections that support encrypted communications, including but not limited to, I$^2$C, USB, Thunderbolt, SPI, PCI, and/or other bus connections.

Host processor 204*a* may be configured to only have access to the first network controller 214*a* by providing host processor 204*a* a first MAC address that is assigned to first network controller 214*a*, while embedded controller processor 210*a* may be configured to only have access to second network controller 214*b* by providing embedded controller processor 210*a* a second MAC address that is assigned to second network controller 214*b*. However, as discussed above, first network controller 214*a* and second network controller 214*b* may be provided on different network interface controllers such that buses 216*a* and 216*b* are physically separate buses.

IHS 202 is coupled to off-host authentication processing system 206 that includes off-host processor 206*a*, off-host memory 206*b*, and/or other off-host processing components. In some cases, off-host authentication processing system 206 may be physically disposed outside of chassis 116—that is, off-host authentication processing system 206 is not a part of IHS 202; and it only coupled to it via bus 212. As used herein, the term "off-host" refers to external off-host authentication processing system 206 being distinct from host processing system 204.

Particularly, off-host processor 206*a* within off-host authentication processing system 206 may include a secure processor that is segregated, distinct from, and/or otherwise separate from processor 102 in IHS 202, and off-host memory 206*b* within external off-host authentication processing system 206 may include a memory device that is segregated, distinct from, and/or otherwise separate from system memory 114 in IHS 202 such that off-host memory 206*b* is accessible by off-host processor 206*a* but not by host processor 204*a*. In an example, off-host authentication processing system 206 may be provided, at least in part, using a CONTROLVAULT system that is available from DELL, INC.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in off-host authentication processing system 206 via USB or Smart Card Interface (SCI) bus 209*a*. However, bus 209*a* may be any variety of physical/logical bus connections including but not limited to, USB, SCI, Thunderbolt, I$^2$C, SPI, PCI, and/or other bus connections.

Each of first network controller 214*a* and second network controller 214*b* is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by off-host authentication processing system 206. For example, the at least one user IHS private key and the at least one user IHS public key may be stored on off-host memory 206*b*, on host memory 204*b*, and/or in a variety of other user IHS storage locations. Furthermore, the at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government may provide, house, or otherwise maintain control of each of network 218, authentication IHS 220, and directory system 222 in order to provide an increased level of security using environment 200.

In some embodiments, the system of FIG. 2 may be used to perform out-of-band authentication such that a user must authenticate to off-host authentication processing system 206 in order to access functionality of IHS 202 that is provided by its host processing system 204. The authentication of a user to access the functionality of IHS 202 is controlled by off-host authentication processing system 206, authentication IHS 220, and/or directory system 222 that operate to verify the user and release a token to host processing system 204 that provides the user access to IHS 202.

Particularly, verification of a user may be performed by authentication IHS 220 such that IHS 202 never stores authentication credentials for any user, while authentication tokens are encrypted and exchanged between off-host authentication processing system 206 and authentication IHS 220 such that authentication IHS 220 can send an approval message to directory system 222 to provide for the release of a token to host processing system 204 that allows a user access to IHS 202 if they have been validated. Because host processing system 204 and off-host authentication processing system 206 need not interact in the out-of-band authentication system, host processing system 204 and off-host authentication processing system 206 may be physically segregated (e.g., there may be no communications bus connecting or directly connecting host processing system 204 and external off-host authentication processing system 206) to prevent any access or compromise of host processing system 204 from enabling an unauthorized user to access functionality of IHS 202.

Figure 3:
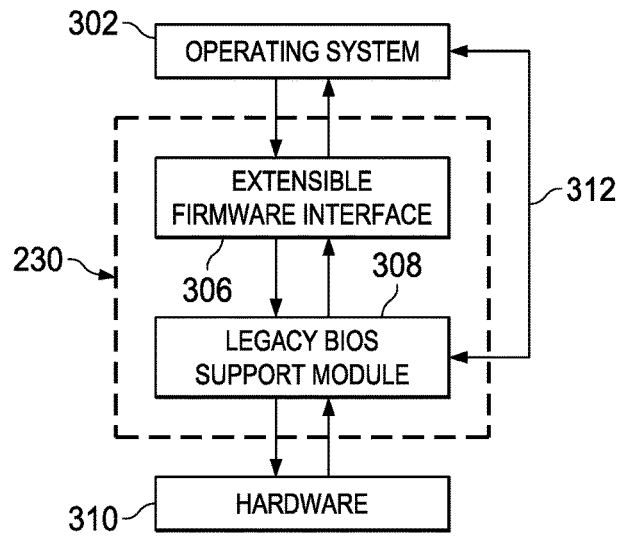
FIGS. 3 and 4 are block diagrams of examples of aspects of an Extensible Firmware Interface (EFI) environment utilized by systems and methods described herein according to some embodiments.

Turning now to FIG. 3, examples of aspects of an EFI environment created by BIOS 230 of IHS 202 are described according to some embodiments. As shown, BIOS 230 comprises firmware compatible with the EFI Specification from INTEL CORPORATION or from the UEFI FORUM. The EFI Specification describes an interface between OS 302 and BIOS 230; particularly, the EFI Specification defines the interface that hardware 310 implements, and the interface that OS 302 may use in booting.

According to an implementation of EFI, both EFI 306 and legacy BIOS support module 308 may be present in BIOS 230. This allows IHS 202 to support both firmware interfaces. In order to provide this, interface 312 may be used by legacy OSs and applications. Additional details regarding the architecture and operation of the EFI 306 are provided below with respect to FIG. 4. Moreover, additional details regarding the operation and architecture of EFI can be found in the EFI Specification and the Framework, which are available from INTEL CORPORATION.

Figure 4:
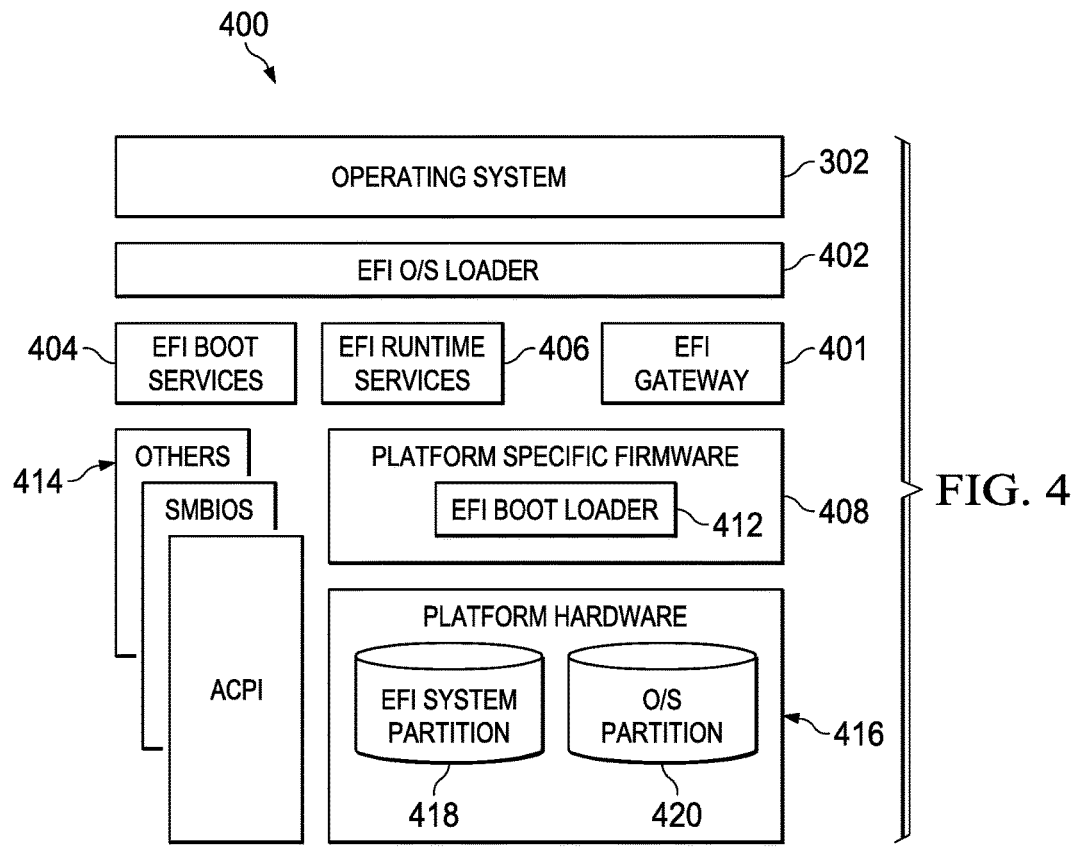

Turning now to FIG. 4, additional details regarding an EFI system 400 utilized to provide an operating environment for various embodiments are described. As shown in FIG. 4, system 400 includes platform hardware 416 and OS 302. Platform firmware 408 may retrieve an OS image from EFI system partition 418 using an EFI O/S loader 402. EFI system partition 418 may be an architecturally shareable system partition. As such, EFI system partition 418 defines a partition and file system that are designed to allow safe sharing of mass storage between multiple vendors. O/S partition 420 may also be utilized.

Once started, EFI O/S loader 402 continues to boot the complete OS 302. In doing so, EFI O/S loader 402 may use EFI boot services 404 and interface to other supported specifications to survey, comprehend, and initialize the various platform components and the operating system software that manages them. Thus, interfaces 414 from other specifications may also be present on the system. For example, the Advanced Configuration and Power Management Interface (ACPI) and the System Management BIOS (SMBIOS) specifications may be supported.

EFI boot services 404 provides interfaces for devices and system functionality that can be used during boot time. EFI runtime services 406 may also be available to the O/S loader 402 during the boot phase. For example, a minimal set of runtime services may be presented to ensure appropriate abstraction of base platform hardware resources that may be needed by OS 302 during its normal operation. EFI allows extension of platform firmware by loading EFI driver and EFI application images which, when loaded, have access to EFI-defined runtime and boot services.

Various program modules provide boot and runtime services. These program modules may be loaded by the EFI boot loader 412 at system boot time. EFI boot loader 412 is a component in the EFI firmware that determines which program modules should be explicitly loaded and when. Once the EFI firmware is initialized, it passes control to boot loader 412. Boot loader 412 is then responsible for determining which of the program modules to load and in what order.

EFI gateway module 401 is another component created to handle messaging and boot interrupt and placed in the boot order. In some embodiments, EFI gateway module 401 is configured to handle threat models previously created for known good BIOS code that may be encountered during the boot process. The threat model is stored in hardware (e.g., off-host memory 206b), and is known as a reference template.

IHS 202 performs a measured boot where processes and their features are captured and a representation of this measure is compressed into a candidate template and stored in protected device memory. A pointer sent from the environment (pre-boot in this case) to hardware where the candidate template is stored in protected memory. If the threat model is violated such that it indicates a compromise, EFI gateway module 401 alerts the user and provides mediation.

In some cases, during implementation, if performance is too slow for a full model match, a hash of the boot model may be created and used for matching. Only if the hash does not match (meaning something changed in the boot processes), does a full boot model match take place. These, and other operations, are described with respect to FIG. 5.

Figure 5:
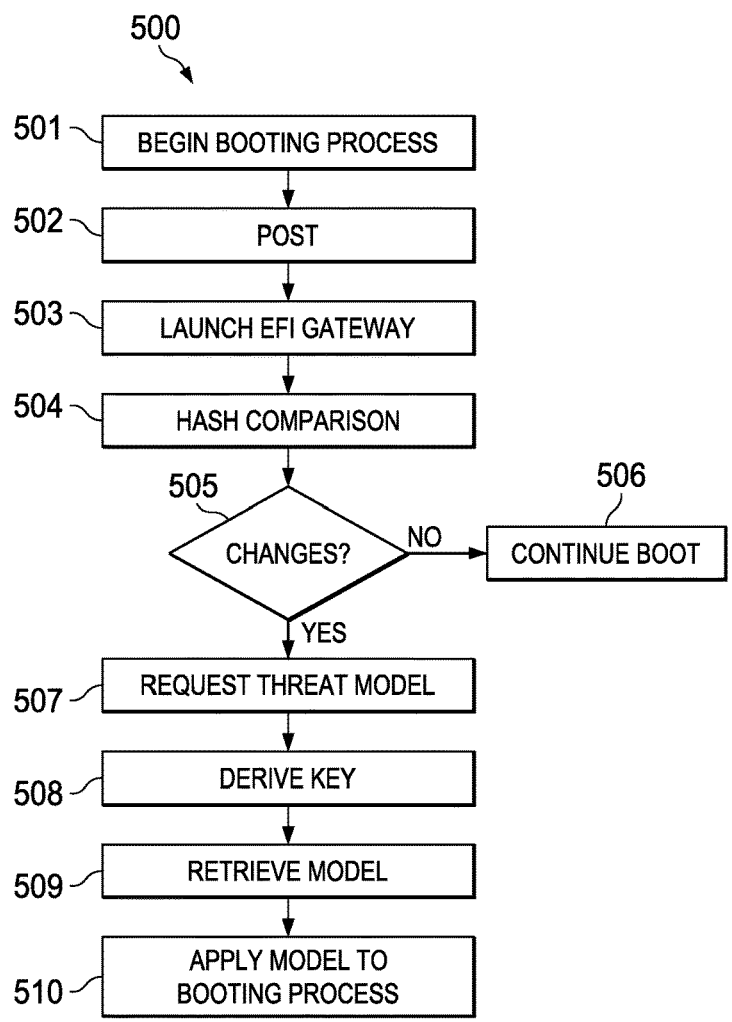
FIG. 5 is a flowchart of an example of a method for hardware hardened advanced threat protection according to some embodiments.

Turning now to FIG. 5, a flowchart of an example of method 500 for hardware hardened advanced threat protection is depicted according to some embodiments. At block 501, IHS 202 begins its booting process whereby host processor 204a uses BIOS instructions stored in BIOS 230 to initialize its hardware and eventually pass control of IHS 202 to an OS. At block 502, a Power-On Self-Test (POST) procedure is performed. Immediately upon completion of POST, block 503 launches EFI gateway module 401.

At block 503, EFI gateway module 401 is loaded into EFI system 400 to run and handle messaging and boot interrupt. In some embodiments, EFI gateway module 401 creates a hash of the boot model and compares it with a previous hash at block 504. Block 505 then determines whether there have been any changes in the boot model between the last successful boot and the present boot by comparing the two hashes. If the hashes match, then the current boot model is the same as before, and method 500 continues to boot IHS 202 at block 506. When any changes are detected, however, control passes to block 507.

At block 507 EFI gateway module 401 requests that a threat model be loaded. In some cases, the threat model may be stored in off-host memory 206b of off-host processing system 206, and may be extracted therefrom by embedded controller 210.

The threat model stored within off-host memory 206b may have been created at runtime by a threat model creation application. This application may include anti-malware protection application that uses artificial intelligence (that is, not signature-based) to perform malware detection by examining the behavior of IHS 202 during a current booting process and comparing that behavior to one or more thresholds of known good behavior.

Parts of the booting process that may be verified again malware include, but are not limited to, pre-initialization, System Management Interrupt (SMI), runtime immediately before Boot Device Selection (BDS), etc. Moreover, examples of behavior examined by the threat model include registry accesses at particular times, boot mode (e.g., outside of cold boot, S3 or S4), the loading of certain drivers, the presence of shims (libraries that transparently intercept API calls and change arguments, handle operations, or redirect operations), the size of temporary stacks, RAM utilization, etc.

As used herein the term "malware" may refer to a variety of forms of hostile or intrusive software, including, for example: computer viruses, worms, trojan horses, ransomware, spyware, adware, scareware, and other malicious programs. For example, malware may take the form of executable code, rootkits, scripts, active content, and other software. In various embodiments, the malware that is the subject of the techniques described herein affect BIOS instructions as they are executed during the booting process; as opposed to the OS executed by IHS 202 after booting is completed.

For sake of illustration, a threat model creation application may create a threat model as follows. First, the threat model creation application may receive a large number of good known sets of BIOS instructions. Then, a threat model may be created as a series of if-then rules or statements that define well-known, good behavior within thresholds. For example, with good BIOS code—that is, code that is known not to include any malware—memory utilization may be below a first threshold and/or above a second threshold during a first time interval, and below a third threshold and/or above a fourth threshold during a second time interval. Therefore, if memory utilization violates these rules, the model may predict that the BIOS code is anomalous and therefore affected by malware. Once a sufficient number of behaviors is analyzed and these various corresponding rules are created, the model may be assembled, for example, in the form of an XML file or the like.

Once the entire threat model is created, the creation application requests that it be stored within off-host memory 206b of off-host processing system 206. To achieve this, embedded controller processor 210a creates a key unique to IHS 202. For example, embedded controller processor 210a may take measurements of host processor 204a including voltage and/or temperature, combine those measurements with a serial number unique to processor 204a, and create a hash of these various variables.

Embedded controller processor 210a then takes the threat model, still currently stored in host memory 204b, and stores it as a secured object within off-host memory 206b using the derived key as the secret necessary to retrieve that object later. The threat model stored in off-host memory 206b remains secured until EFI gateway module 401 requests that it be retrieved during a subsequent booting of IHS 202.

Returning now to FIG. 5, at block 507 EFI gateway module 401 requests that the threat model be retrieved from off-host memory 206b. To this end, embedded controller 210 again derives the same key in the same manner as previously derived by request from the model creation application. Embedded controller 210 sends the key to off-host processor 206a, retrieves the model at block 509, and stores it in host memory 204b, where EFI gateway module 401 can then access it. At block 510, EFI gateway module 401 applies the threat model to the booting process and takes corrective action (e.g., halt boot, notify a user, etc.) upon detection of any behavioral anomalies that indicate the BIOS code may be compromised by malware.

In alternative embodiments, the determination of whether the BIOS instructions include malware is made under control of EFI gateway module 401 in cooperation with processing performed by off-host processor 206a and/or embedded controller processor 210a. That is, application of the threat model may be performed without loading the model onto host memory 204b, but rather by keeping it segregated in hardware within the distinct processing environment of off host processing system 206 or embedded controller system 210.

As described herein, systems and methods described herein may provide hardware protected Anti-malware for trusted boot of an IHS. Boot compromises may be found real-time, prevent access to the operating system, and provide messaging and remediation. In some cases, a hash of measured boot processes may be used for faster validation. Moreover, in some implementations these techniques may gate kernel launch(es) when the boot process has been compromised.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a Basic Input/Output System (BIOS) coupled to the processor, the BIOS having BIOS instructions stored thereon that, upon execution, cause the IHS to:
launch an Extensible Firmware Interface (EFI) gateway module; and
determine, using the EFI gateway module, whether the BIOS instructions include malware, by applying a behavior-based threat model to a behavior of the IHS during a booting of the IHS, wherein the determination is based upon a memory utilization during the booting being: (a) below a first predetermined threshold or above a second predetermined threshold during a first time interval, and (b) below a third predetermined threshold or above a fourth predetermined threshold during a second time interval;
an embedded controller coupled to the processor; and
an off-host authentication processing system coupled to the embedded controller, wherein the off-host authentication processing system provides a hardware environment segregated from the processor, wherein the off-host authentication processing system has an off-host processor and an off-host memory coupled to the off-host processor, and wherein the behavior-based threat model is stored in the off-host memory, wherein the behavior-based threat model is retrieved by the EFI gateway module through the embedded controller upon presentation of a key by the embedded controller to the off-host processor.

2. The IHS of claim 1, wherein the launch of the EFI gateway module occurs immediately after a Power-On Self-Test (POST).

3. The IHS of claim 1, wherein the determination is performed in response to another determination that a change has taken place in the BIOS instructions since a last boot.

4. The IHS of claim 1, wherein the key is derived by the embedded controller upon request by the EFI gateway module based upon a voltage within the processor, a temperature of the processor, and a serial number of the processor.

5. The IHS of claim 1, wherein the determination is performed by the processor.

6. The IHS of claim 1, wherein the determination is performed by the embedded controller.

7. The IHS of claim 1, wherein the determination is performed by the off-host processor.

8. A Basic I/O System (BIOS) having instructions stored thereon that, upon execution by a processor of an Information Handling System (IHS), cause the IHS to:
launch an Extensible Firmware Interface (EFI) gateway module; and
determine, using the EFI gateway module, whether the BIOS instructions include malware, by applying a behavior-based threat model to a behavior of the IHS during a booting of the IHS, wherein the determination is based upon a memory utilization during the booting being: (a) below a first predetermined threshold or above a second predetermined threshold during a first time interval, and (b) below a third predetermined threshold or above a fourth predetermined threshold during a second time interval, wherein the behavior-based threat model is stored in an off-host memory of off-host authentication processing system that provides a hardware environment segregated from the processor, and wherein the behavior-based threat model is retrieved by the EFI gateway module through an embedded controller upon presentation of a key by the embedded controller to the off-host processing system.

9. The BIOS of claim 8, wherein the launch of the EFI gateway module occurs immediately after a Power-On Self-Test (POST).

10. The BIOS of claim 8, wherein the determination is performed in response to another determination that a change has taken place in the BIOS instructions since a last boot.

11. The BIOS of claim 8, wherein the key is derived by the embedded controller upon request by the EFI gateway module based upon a voltage within the processor, a temperature of the processor, and a serial number of the processor.

12. The BIOS of claim 8, wherein the determination is performed by the processor.

13. The BIOS of claim 8, wherein the determination is performed by the embedded controller.

14. The BIOS of claim 8, wherein the determination is performed by the off-host processor.

15. A method, comprising:
launching an Extensible Firmware Interface (EFI) gateway module; and
determining, using the EFI gateway module, whether BIOS instructions include malware, by applying a behavior-based threat model to a behavior of an Information Handling System (IHS) during a booting of the IHS, wherein the determination is based upon a memory utilization during the booting being: (a) below a first predetermined threshold or above a second predetermined threshold during a first time interval, and (b) below a third predetermined threshold or above a fourth predetermined threshold during a second time interval, wherein the behavior-based threat model is stored in an off-host memory of off-host authentication processing system that provides a hardware environment segregated from a processor of the IHS, and wherein the behavior-based threat model is retrieved by the EFI gateway module through an embedded controller of the IHS upon presentation of a key by the embedded controller to the off-host processing system.

16. The method of claim 15, wherein the launch of the EFI gateway module occurs immediately after a Power-On Self-Test (POST).

17. The method of claim 15, wherein the determination is performed in response to another determination that a change has taken place in the BIOS instructions since a last boot.

18. The method of claim 15, wherein the key is derived by the embedded controller upon request by the EFI gateway module based upon a voltage within the processor, a temperature of the processor, and a serial number of the processor.

19. The method of claim 15, wherein the determination is performed by the embedded controller.

20. The method of claim 15, wherein the determination is performed by the off-host processor.

* * * * *